United States Patent [19]

Matsura

[11] Patent Number: 5,218,937
[45] Date of Patent: Jun. 15, 1993

[54] DIESEL ENGINE

[75] Inventor: Yoshimasa Matsura, Yokohama, Japan

[73] Assignee: Mitsubishi Jidosha Kogyo Kabushiki Kaisha, Tokyo, Japan

[21] Appl. No.: 964,906

[22] Filed: Oct. 22, 1992

Related U.S. Application Data

[62] Division of Ser. No. 835,545, Feb. 14, 1992, Pat. No. 5,186,139.

Foreign Application Priority Data

Feb. 19, 1991 [JP] Japan ................................. 3-13723

[51] Int. Cl.[5] .............................................. F02B 31/00
[52] U.S. Cl. .................................... 123/301; 123/262
[58] Field of Search .................................. 123/301, 262

[56] References Cited

U.S. PATENT DOCUMENTS

| | | | |
|---|---|---|---|
| 4,522,173 | 6/1985 | Agache | 123/301 |
| 4,526,143 | 7/1985 | Osbima et al. | 123/301 |
| 4,548,172 | 10/1985 | Bailey | 123/301 |
| 4,641,617 | 2/1987 | Aoyaura et al. | 123/301 |

Primary Examiner—Raymond A. Nelli

[57] ABSTRACT

A diesel engine includes a variable swirl forming mechanism, an exhaust gas recirculation (EGR) control mechanism, and an injection timing control mechanism. The variable swirl forming mechanism forms strong, middle or weak air swirls in a combustion chamber according to engine loads and engine speeds. The EGR control mechanism recirculates a part of exhaust gas to the combustion chamber according to the engine loads and the engine speeds. The injection timing control mechanism advances or retards the injection timing according to the engine loads and the engine speeds.

14 Claims, 9 Drawing Sheets

DIESEL ENGINE

This application is a division of copending application Ser. No. 07/835,545, filed on Feb. 14, 1992, now U.S. Pat. No. 5,186,139. The entire contents of which are hereby incorporated by reference.

BACKGROUND OF THE INVENTION

1. Field of the Invention

This invention relates to a diesel engine which assures excellent engine performance and can purify exhaust gas satisfactorily.

2. Description of the Related Art

The diesel engine has to meet very strict requirements for much cleaner exhaust gas. A wide assortment of measures have been proposed and devised for this purpose. Various control systems have been proposed and put into practical use to decrease nitrogen oxides (NOx) in the exhaust gas, and hydrocarbon in particulates and soot, respectively.

A variable swirl control system has been proposed to form air swirls in a combustion chamber, for thereby efficiently forming an air-fuel mixture to burn the fuel completely and decrease the particulate and soot. An exhaust gas recirculation (EGR) control system recirculates part of exhaust gas to the combustion chamber according to the working conditions of the engine, for decreasing the concentration of oxide, lowering the combustion temperature, and suppressing NOx. A timing control system controls the fuel injection timing to reduce NOx and particulates. Furthermore, efforts have been made to devise shapes of fuel injection units and combustion chambers. The exhaust gas discharged via the foregoing control systems are further filtered by an exhaust gas purifier located in a scavenge passage.

Any of the foregoing control systems however cannot independently cope with all the problems of the exhaust gas. These control systems have advantages and disadvantages. To purify the exhaust gas by a single control system, such a control system inevitably becomes more complicated and more expensive. Specifically, it is not possible at all to have a single control system purify the exhaust gas of a vehicle engine whose working condition changes incessantly. Conventional control systems are considered acceptable when they purify the exhaust gas to a certain preferable degree. Usually, to emit cleaner exhaust gas, engine performance is somewhat sacrificed. For instance, suppression of NOx results in the increase of concentration of smoke and hydrocarbon, and the decrease of the engine efficiency. Therefore, the foregoing control systems make it difficult to meet the new requirements for much cleaner exhaust gas so as to prevent air contamination.

SUMMARY OF THE INVENTION

It is therefore an object of the invention to provide a diesel engine which can emit a much cleaner exhaust gas without decreasing the engine performance.

According to the invention, there is provided a diesel engine comprising: a variable swirl forming mechanism for generating strong air swirls in a combustion chamber when the engine is working at low speeds and high loads, middle air swirls in the combustion chamber when the engine is working at low loads and at middle speeds and high loads, and weak air swirls in the combustion chamber when the engine is working at high speeds and high loads; an exhaust gas recirculation (EGR) control mechanism for recirculating part of the exhaust gas to the combustion chamber when the engine is working at low and middle speeds and low loads; an injection timing control mechanism for advancing the fuel injection timing when the engine is working at low loads, and for retarding the fuel injection timing when the engine is working at middle and high loads; and a controller for controlling the variable swirl forming mechanism, EGR control mechanism and injection timing control mechanism according to the loads and speed of the engine.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
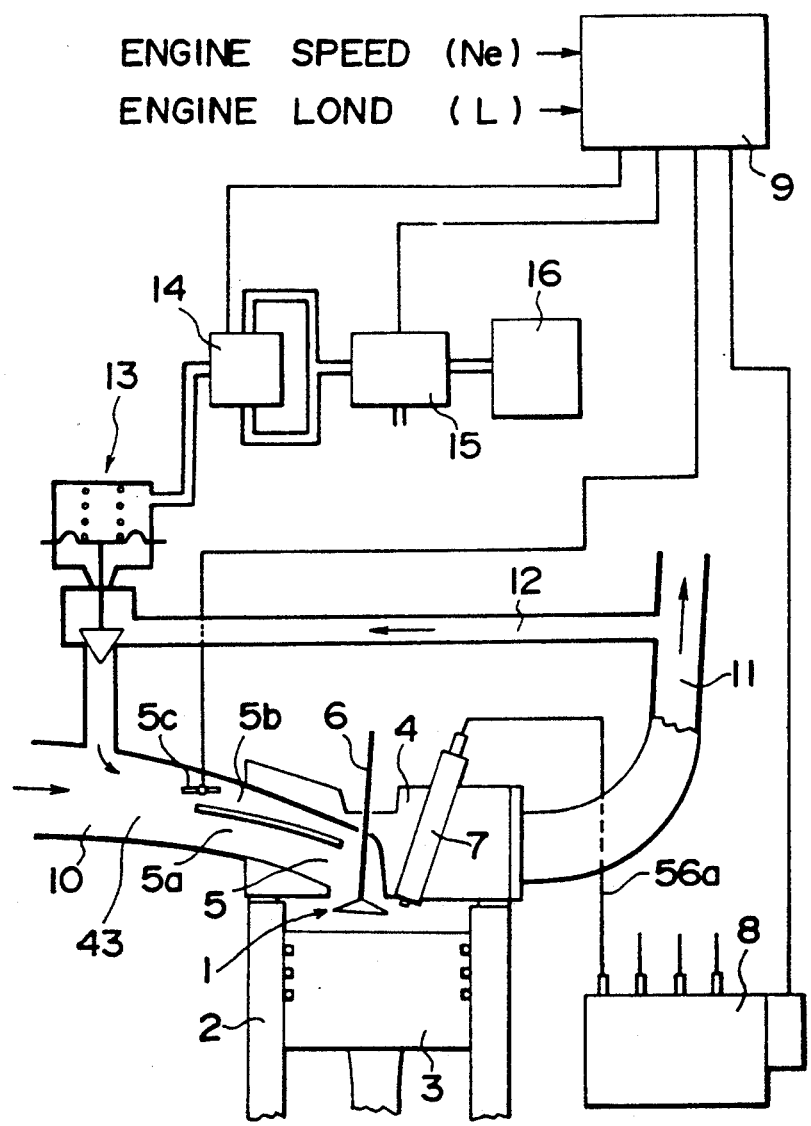
FIG. 1 is a block diagram showing the configuration of a diesel engine according to an embodiment of the invention.

According to an embodiment of the invention, a diesel engine includes a variable swirl forming mechanism, an exhaust gas recirculation (EGR) control mechanism, an injection timing control mechanism, and a controller 9, as shown in FIG. 1.

The variable swirl forming mechanism forms strong, middle or weak air swirls in a combustion chamber according to engine speeds and engine loads, and includes a main port 5a, a sub-port 5b, an auxiliary variable swirl valve 5c, and a drive unit for operating the valve 5c.

The EGR control mechanism recirculates part of the exhaust gas from a scavenge passage 11 to the combustion chamber 1 according to engine conditions. This control mechanism includes an EGR passage 12, an EGR valve 13, and a passage selecting valve 14.

According to engine loads and speeds, the controller 9 controls the variable swirl forming mechanics, the EGR control mechanism and the injection timing control mechanism.

As shown in FIG. 1, a diesel engine includes combustion chambers, a fuel injection pump, a variable swirl forming mechanism for forming weak, middle and strong air swirls in a combustion chamber, an exhaust gas recirculation (hereinafter called "EGR") control mechanism, an injection timing control mechanism, and a controller for controlling the foregoing variable swirl forming mechanism, the EGR control mechanism and the injection timing control mechanism.

Each combustion chamber 1 includes a cylinder 2, a piston 3 and a cylinder head 4. The cylinder head 4 has an inlet valve 6 for opening and closing an inlet port 5, and an injection nozzle 7 for injecting fuel at a proper timing. The injection nozzle 7 is connected to the fuel injection pump 8.

The fuel injection pump 8 is controlled by the timing control mechanism of the controller 9, and the fuel injection pump 8, operated to jet the fuel through the injection nozzle 7 at a proper timing depending upon the engine speed Ne and the load L.

The inlet port 5 communicates with an inlet passage 10 connected to an air cleaner (not shown). The inlet port 5 includes a main port 5a having a large cross-sectional area, and a sub-port 5b having a small cross-sectional area.

The sub-port 5b is opened and closed by an auxiliary variable swirl valve 5c. The auxiliary variable swirl valve 5c is operated by the control signal from the controller 9 depending upon the engine speed Ne and the load L. When the auxiliary variable swirl valve 5c fully closes the sub-port 5b, air is drawn only through the main port 5a, and strong air swirls are formed in the combustion chamber 1. When the auxiliary variable swirl valve 5c fully opens the sub-port 5b, the air is drawn via both the main port 5a and sub-port 5b, and weak air swirls are formed in the combustion chamber 1. When the sub-port 5b is half closed, middle air swirls will be formed in the combustion chamber 1. The movements of the auxiliary variable swirl valve 5c are controlled by a driving unit such as a solenoid-operated valve and a motor which is set in motion according to the signal from the controller 9.

The variable swirl forming mechanism includes a plurality of inlet units 24, inlet manifolds 40 and driving units, which are provided for respective combustion chambers. The variable swirl forming mechanism is controlled by the controller 9.

Figure 2:
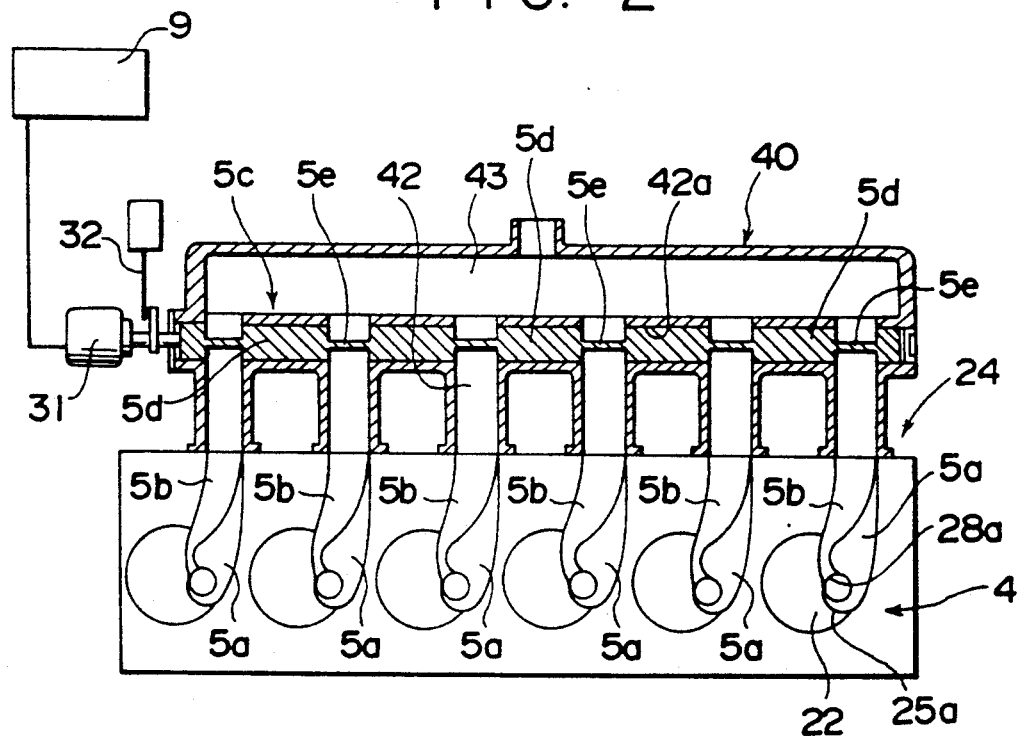
FIG. 2 is a side cross sectional view of a variable swirl forming mechanism.
Figure 3:
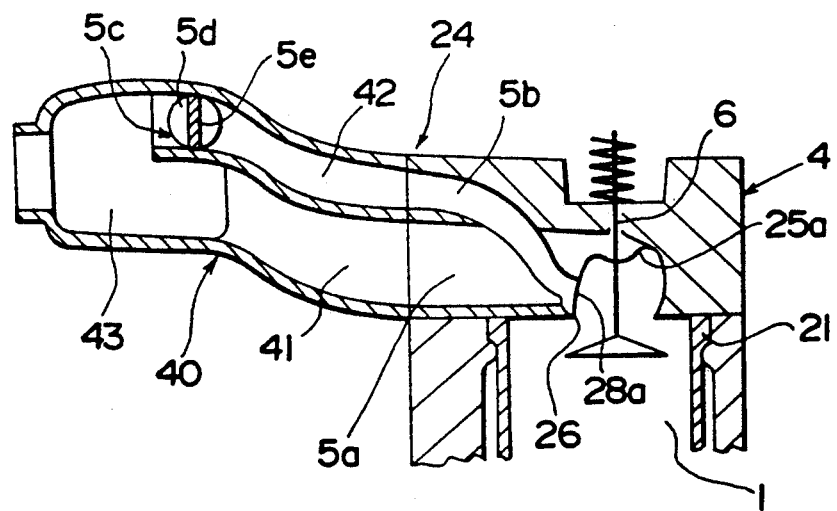
FIG. 3 is a side cross sectional view of the variable swirl forming mechanism of FIG. 2.

As shown in FIGS. 2 and 3, each inlet unit 24 is located in the cylinder head 4. Each intake manifold 40 includes a main branch pipe 41, an auxiliary branch 42, and an air chamber 43. The main branch pipe 41 communicates with the combustion chamber 1 via the main port 5a. The main branch pipe 41 has a large cross-sectional area. The auxiliary branch pipe 42 communicates with the sub-port 5b, which has an opening 28a near the inlet valve 6 and an inlet valve seat 26. The opening 28a of the sub-port 5b faces a circumferential wall of a swirl chamber 25a which is located at the end of the main port 5a.

The auxiliary variable swirl valve 5c is rotatable to open and close the sub-ports 5b of all the intake manifolds 40, and is located at one end each of each sub-port 5b. The auxiliary variable swirl valve 5c includes a shaft 5d, of which an outer surface is cut into a shape similar to a plurality of butterfly valves. The shaft 5d is slightly thicker than each auxiliary branch pipe 42. Hereinafter, a description will be made by taking one of the intake manifolds 40 as an example. The valve auxiliary variable swirl 5c is angularly moved to take three positions to control the airflow. Specifically, when the auxiliary variable swirl valve 5c is perpendicular to the airflow, the auxiliary variable swirl valve 5c closes the auxiliary branch pipe 42 completely. When the auxiliary variable swirl valve 5c is in parallel to the airflow, the auxiliary variable swirl valve 5c fully opens the branch pipe 42. When the auxiliary variable swirl valve 5c is half tilted to the airflow, the auxiliary variable swirl valve 5c half opens the branch pipe 42.

As shown in FIG. 2, the shaft 5d is longitudinally inserted into the intake manifold 40 via a hole 42a which is perpendicular to the auxiliary branch pipe 42, from the right side in FIG. 2. The cut portion 5e of the shaft 5d confronts the auxiliary branch pipe 42. The left end of the shaft 5d projects from the intake manifold 40, and is mechanically coupled to a drive mechanism 31, which is a motor. Reference numeral 32 stands for an angle sensor for detecting the angular movement of the shaft 5d.

The drive mechanism 31 is electrically connected to the controller 9, which is a microcomputer.

When the valve auxiliary variable swirl 5c fully closes the sub-port 5b, the inlet valve 6 is descended to move the inlet valve seat 26 downwardly in the inlet stroke, for thereby conducting the air, which is eccentric in the main port 5a, into the combustion chamber 1, and forcibly forming strong and large air swirls in the combustion chamber 1. This air is mixed with the fuel from the injection nozzle 7 (shown in FIG. 1) so as to be burned.

The controller 9 sends an operation signal to the drive mechanism 31 in response to engine speeds and engine loads. The controller 9 keeps on operating the drive mechanism 31 according to the angular movement of the shaft 5d detected by the angle sensor 32. When the shaft 5d is moved to open the auxiliary variable swirl valve 5c fully, a large amount of the air is introduced into the sub-port 5b via the auxiliary branch pipe 42, and is mixed with the main air (which is conducted via the main port 5a in the forward swirl), and supplied to the combustion chamber 1. Under this condition, the air from the sub-port 5b reverses the main air, which weakens the main forward air swirls.

When it is found that middle air swirls are sufficient to meet the present engine speed and the engine load, the controller 9 operates the drive mechanism 31 to half open the auxiliary variable swirl valve 5c. The amount of the air via the sub-port 5b is decreased to weaken the backward air swirls and to form middle air swirls in the combustion chamber 1.

Figure 4:
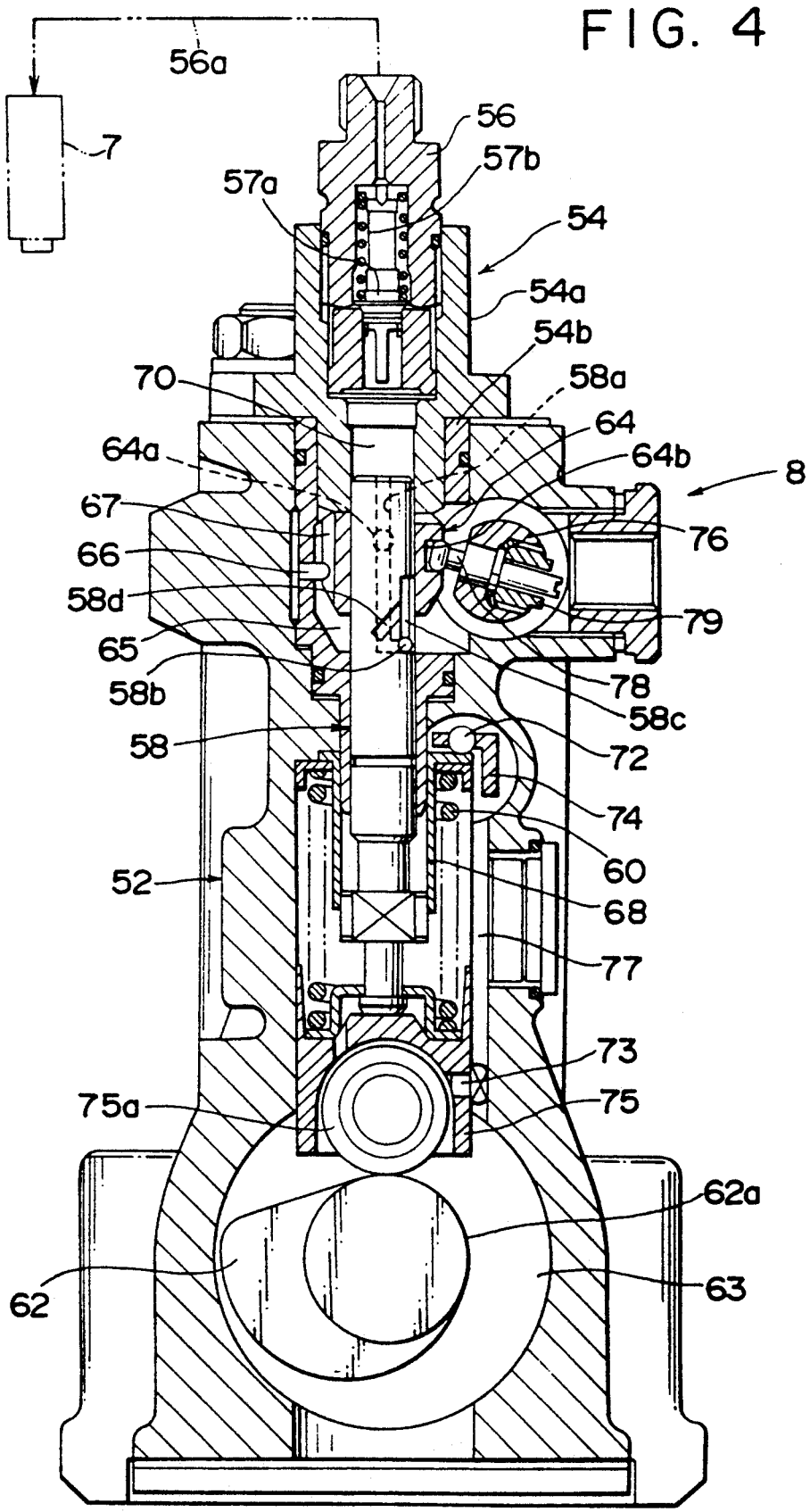
FIG. 4 is an axial cross sectional view of a fuel injection pump.

The fuel injection pump 8 will be described in detail by referring to FIG. 4.

A housing 52 holds therein a plurality of barrels 54 which are axially juxtaposed on one side of the housing 52. Each barrel 54 has a first barrel member 54a and a second barrel member 54b fitted into the first barrel member 54a.

A delivery valve holder 56 is connected to a cylinder located atop the barrel 54, and has a delivery valve 57a fitted therein.

A plunger 58 is slidably fitted in the barrel 54, and is downwardly urged by a spring 60. A cam 62 is coupled to a drive shaft of the engine, not shown, to push the plunger 58 upwards.

A control sleeve 64 is slidably fitted around the plunger 58. The sliding movement of the control sleeve 64 is regulated by a guide pin 66 which is fitted into a guide groove of the control sleeve 64.

A joint 68 is movably supported by the second barrel member 54b and is fixedly secured to the plunger 58.

The plunger 58 has an oil gallery 58a, an opening 58b, a slit 58c, and a slit 58d. The oil gallery 58a communicates with the upper end and circumferential surface of the plunger 58. The opening 58b is formed on the surface of plunger 58, and communicates with the oil gallery 58a. The slit 58c is axially formed on the surface of the plunger 58. The slit 58d is formed on the plunger, and is tilted with respect to the axis of the plunger 58. The slits 58c, 58d and the opening 58b serve as a control groove. The control sleeve 64 has a through-hole 64a for controlling the end of the fuel injection stroke.

A fuel chamber 65 stores the fuel supplied from a fuel feed pump, which is not shown. This fuel does not leak into a camshaft chamber 63 since the plunger 58 is oil-tightly fitted in the second barrel member 54b in the cylindrical shape.

A guide pin 73 projects from a tappet 75, and is slidably fitted into a guide groove 77 formed on the housing 52.

An adjusting shaft 76 is for fine adjustment of the fuel injection timing, and has an adjusting screw 79 threadably fitted in a screw hole thereof. The adjusting shaft 76 is turned by loosening the adjusting screw 79 for the foregoing purpose.

When a cam 62 is rotated once by a camshaft 62a which is operated by the drive shaft of the engine, a tappet roller 75a reciprocates the plunger 58 in one stroke each time the tappet roller 75 is pushed by the cam 62. In other words, the aforementioned reciprocation of the plunge delivers the fuel under pressure.

Figure 5A:
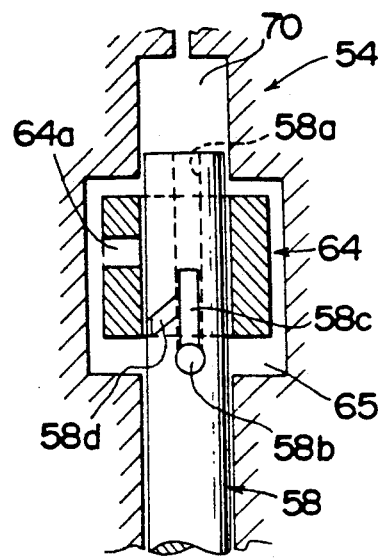
FIGS. 5a to 5e show the operation sequence illustrating how fuel is delivered under pressure by a plunger of the fuel injection pump.

The reciprocation sequence of the plunger 58 is described hereinafter by referring to FIGS. 5a to 5e. It is assumed that the control sleeve 64 is at its home position during the sequence shown in FIGS. 5a and 5b. When the control sleeve 64 and plunger 58 are relatively positioned as shown in FIG. 5a, i.e. the opening 58b is not yet fully closed by the control sleeve 64, a pressurized chamber 70 communicates with the fuel chamber 65, so that no fuel is delivered.

Figure 5B:
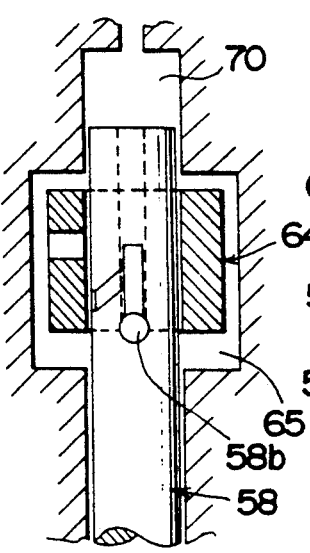
Figure 5C:
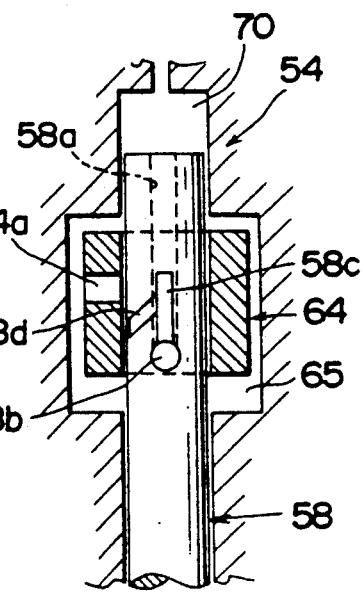

When the opening 58b is closed by the control sleeve 64 as shown in FIG. 5c following the state shown in FIG. 5b, the pressurized chamber 70 is insulated from the fuel chamber 65, and is pressurized by the plunger 58. The plunger 58 is lifted to the position of FIG. 5c from the position of FIG. 5a. This movement of the plunger 58 is called "prestroke."

Figure 5D:
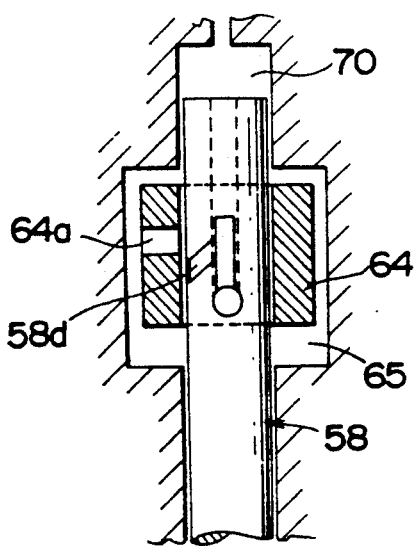
Figure 5E:
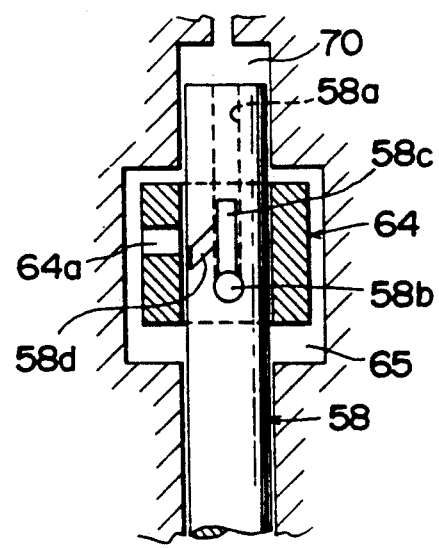

The plunger 58 keeps on moving upwards as shown in FIG. 5d. Then, the pressure in the pressurized chamber 70 overcomes the force of a spring 57 of the delivery valve holder 56, for opening an output port 57a, and supplying the pressurized fuel to the injection nozzle 7 via an injection pipe 56a (shown in FIG. 4). The pressurized fuel is delivered to the injection nozzle 8 until the slit 58d communicates with the control hole 64a as shown in FIG. 5e. When the slit 58d begins to reach the control hole 64a, the pressurized chamber 70 communicates with the fuel chamber 65 via the oil gallery 58a, the opening 58b and the slit 58c, for thereby completing delivery of the pressurized fuel.

As the plunger 58 is moved upwardly by the joint 68 (shown in FIG. 4), the timing for the slit 58d to reach the control sleeve 64 can be changed during the stroke of the plunger 58. The amount of the fuel to be injected per stroke of the plunger 58 can be adjusted accordingly. The movement of the joint 68 is controlled by longitudinally displacing a rack 74 engaged with a ball 72 which is fixedly secured to the top of the joint 68.

The injection timing control mechanism will be described hereinafter. The injection timing is controlled by sliding the control sleeve 64 around the plunger 58. The control sleeve 64 is slid by the adjusting shaft 76, a lever 78, and a cut 64b. The adjusting shaft 76 is located near the control sleeve 64, and has an axis which is parallel to the plane where the foregoing barrels 54 are juxtaposed and which is perpendicular to the axis of the plunger 58. The lever 78 is fixedly secured to the adjusting shaft 76, and projects toward the plunger 58. The cut 64b is formed on the outer surface of the control sleeve 64, for receiving one end of the adjusting shaft 76. With this arrangement, the adjusting shaft 76 moves to slide the control sleeve 64 via the cut 64b.

The control sleeve 64 is displaced downwardly or upwardly to advance or retard the fuel injection timing. The outer end surface of the lever 78 is rounded to be always in close contact with the inner surface of the cut 64b.

In response to a signal from the controller 9, the adjusting shaft 76 is operated by an electromagnetic solenoid via an operation lever connected to the other end of the adjusting lever 76. The electromagnetic solenoid and the operation lever are not shown in FIG. 4. The control sequence of the fuel injection timing will be described later.

Referring to FIG. 1 again, the EGR control mechanism is described here. An exhaust gas recirculation passage 12 (called "EGR passage 12" hereinafter) is branched from the scavenge passage 11, and is connected to the inlet passage 10 via an EGR valve 13. The EGR valve 13 is for recirculating part of the exhaust gas to the combustion chamber 1, and is actuated by a passage selecting solenoid valve 14, a duty solenoid valve 15 and a vacuum pump 16, all of which are actuated according to the working condition of the engine.

The duty solenoid valve 15 undergoes the duty control in response to a signal from the controller 9, for supplying a negative pressure to the EGR valve 13 from the vacuum pump 16 via the passage selecting solenoid valve 14. The passage selecting solenoid valve 14 opens and closes the EGR valve 13 in response to the EGR control signal from the controller 9, for controlling recirculation of the exhaust gas.

The controller 9 operates as described hereinafter. The controller 9 is supplied with an engine speed signal from an engine speed sensor (Ne sensor), and an engine load signal from a load sensor (L sensor) which detects the engine load according to the operated extent of an accelerator.

Figure 6:
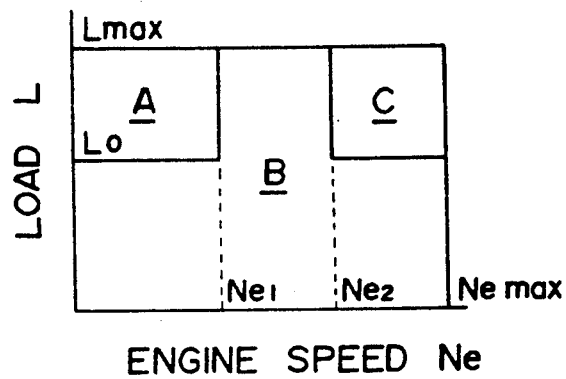
FIG. 6 is a diagram showing one example of a swirl control map.

The controller 9 has a swirl control map for operating the variable swirl forming mechanism at a proper timing. In FIG. 6, the ordinate represents the load L, and the abscissa represents the engine speed Ne. The strong, middle and weak swirl regions are mapped as A, B, and C, respectively, in FIG. 6. In FIG. 6, L max stands for the maximum load, Ne max stands for the maximum engine speed. $Lo = (0.6$ to $0.7)$ L max, $Ne_1 = (0.45$ to $0.55)$ Ne max, and $Ne_2 = (0.65$ to $0.75)$ Ne max.

The strong swirl region A corresponds to the engine working range at low speeds and high loads, in which the engine speed $Ne < Ne_1$ and the load $L \geq L_0$. In the strong swirl region A, the auxiliary variable swirl valve 5c closes the sub-port 5b to introduce the air into the combustion chamber 1 only via the main port 5a, for forming the strong air swirl in the combustion chamber 1 to enhance the formation of the air-fuel mixture.

The weak air swirl region C corresponds to the engine working range at high engine speeds and high loads, in which $Ne \geq Ne_2$ and $L \geq L_0$. The auxiliary variable swirl valve 5c fully opens the sub-port 5b to conduct the air into the combustion chamber 1, for thereby forming weak air swirls therein.

The middle air swirl range B corresponds to the engine operating range at low-loads, and high loads and middle speeds. The sub-port 5b is half opened to form middle air swirls.

Figure 7:
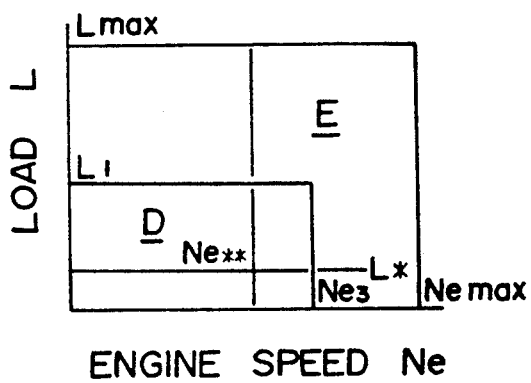
FIG. 7 is a diagram showing one example of an EGR control map.

As shown in FIG. 7, the EGR control map of the controller 9 includes the EGR region D in which the auxiliary EGR valve 13 is opened to circulate part of the exhaust gas, and the non-EGR region E where the EGR valve 13 is closed. The EGR region D corresponds to low loads in which $L_1$ is equal to or less than 0.45 to 0.55 times L max, and low and middle engine speeds in which $Ne_3$ is equal to or less than 0.8 to 0.85 times Ne max.

Figure 8:
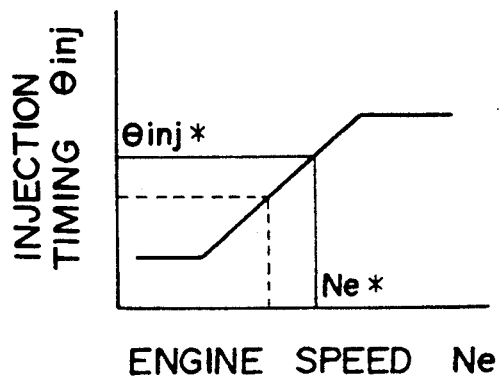
FIG. 8 is a diagram showing one example of an injection advance map.
Figure 11:
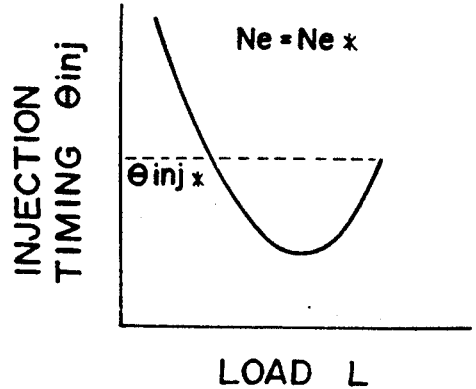
FIG. 11 is a graph showing the relationship between the injection advance timing and the load.

The operation of the fuel injection pump 8 is controlled according to the injection advance control map (which has the characteristic as shown in FIG. 8) so as to inject the fuel via the fuel injection nozzle 7. When the engine speed $Ne = Ne^*$, the injection timing $\theta inj$ is advanced or retarded according to the load as shown in FIG. 11. The injection timing is extensively advanced when the load L is extremely low. On the contrary, the injection timing is retarded for the middle and high load ranges.

Figure 12:
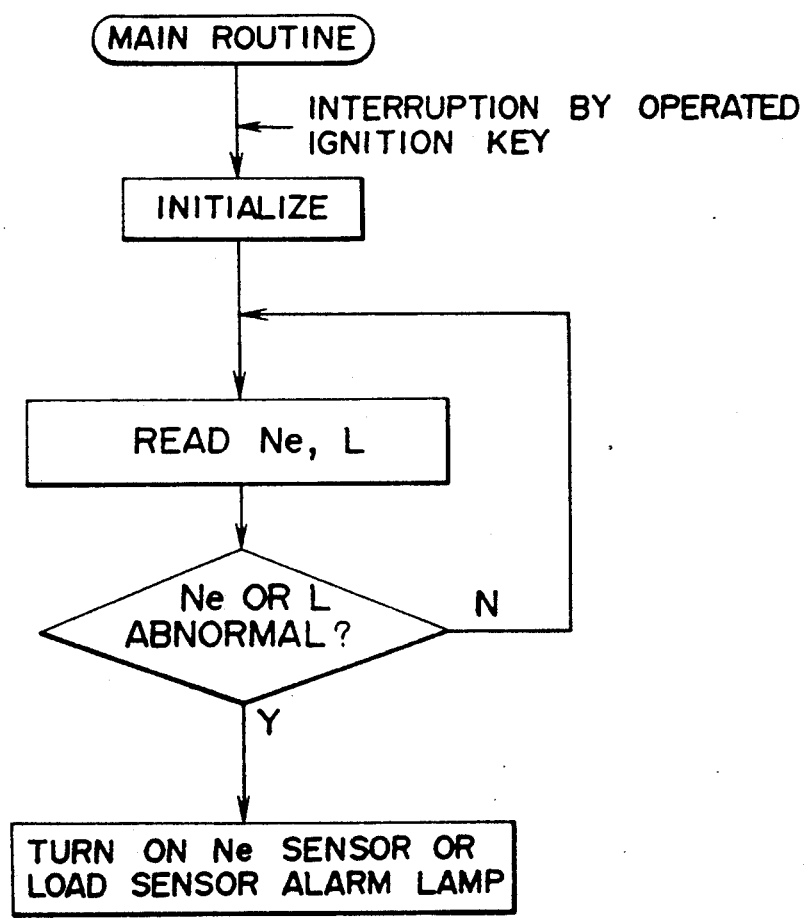
FIG. 12 is a flowchart of a main routine for controlling the exhaust gas.

The main routine for controlling the exhaust gas will be described with reference to FIG. 12. When an ignition key is turned on to start the engine, all the data are initialized in the controller 9. The controller 9 reads various data on the engine speed Ne and the engine load L. The controller 9 checks whether or not the engine speed Ne and the load L are normal. If not, control returns to the step to the engine speed check Ne and the load L. When the engine speed Ne and the load L are abnormal, the controller 9 turns on an alarm lamp to warn maloperation of the engine speed sensor or the load sensor.

Figure 13:
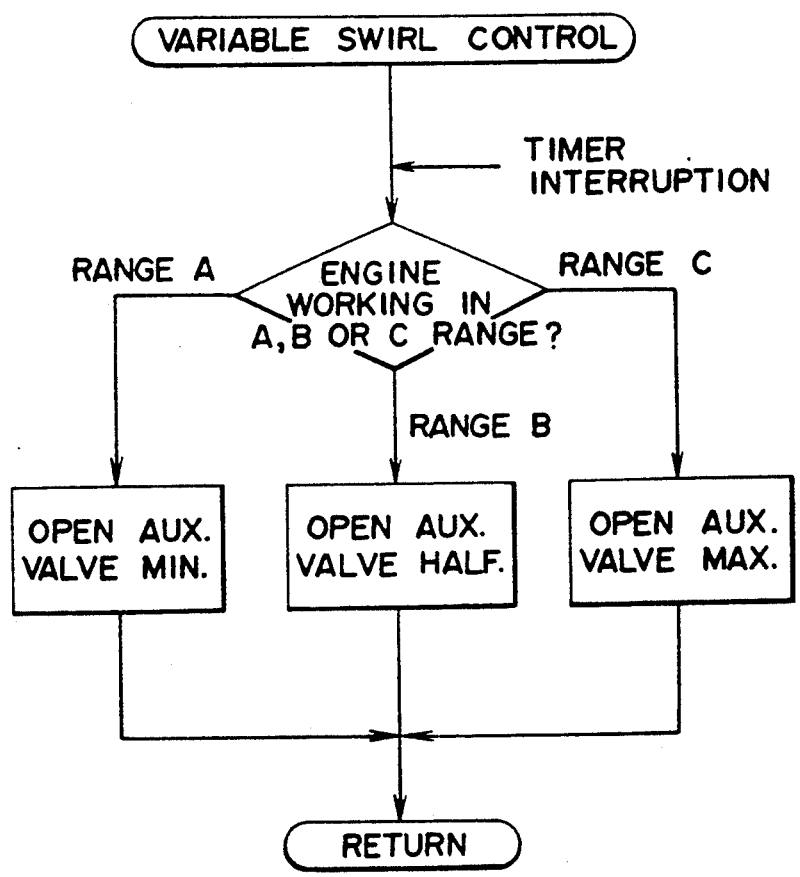
FIG. 13 is a flowchart of a program for variable swirl control.

Referring to FIG. 13, the variable swirl control routine will be described. When the engine is periodically operated by the timer, the controller 9 checks the present working condition of the engine based on the read engine speed Ne and the load L with reference to the variable swirl control map (shown in FIG. 6).

When the engine is working at low speeds and high loads, fuel is jetted in the shape of large particles into the combustion chamber 1 from the fuel injection nozzle 7, and a little air is conducted into the combustion chamber 1, so that incompletely burned fuel tends to form as soot. Therefore, if the engine speed Ne is smaller than $Ne_1$ and the load L is larger than $L_0$, the controller 9 recognizes that the strong air swirl region A should be established, and operates the drive mechanism 31, which angularly moves the auxiliary variable swirl valve 5c substantially close to the sub-port 5b. Then, air is introduced only via the main port 5a (shown in FIG. 5) so as to form the strong air swirls in the combustion chamber 1. The strong air swirls are mixed with the fuel injected at the specified timing, for thereby enhancing formation of air-fuel mixture and complete combustion of the fuel and, suppressing formation of soot.

When the engine is working at high speeds and high loads, the fuel is injected in the form of fine particles and a large amount of air is conducted into the combustion chamber 1. At the engine speed $Ne > Ne_2$ and the load $L > L_0$, the controller 9 recognizes that the weak air swirl region C should be established. Then, the controller 9 fully opens the auxiliary variable swirl valve 5c to conduct a large amount of air via the main port 5a and sub-port 5b, for thereby forming weak air swirls in the combustion chamber 1 and suppressing soot.

In the swirl control map shown in FIG. 6, the region B corresponds to the engine speed Ne and the load L as follows: $Ne < Ne_1$ and $L < L_0$, $Ne_1 \leq Ne < Ne_2$, and $Ne > Ne_2$ and $L < L_0$. When the load L is low in the region B, the amount of the fuel to be injected is small and a relatively large amount of air is introduced regardless of the engine speed. Since the strong air swirl is not necessary in the region B, so that the controller 9 operates the drive mechanism 31 to angularly move the auxiliary variable swirl valve 5c, for thereby half opening the sub-port 5b. Thus, the combustion temperature is prevented from becoming unnecessarily high, for thereby decreasing hydrocarbon.

At middle engine speeds and high engine loads, the injection pressure of the injection nozzle 7 is high enough to jet the fuel in the form of relatively small particles. Furthermore, the amount of the conducted air is moderate, so that the middle air swirls are formed to suppress hydrocarbon and soot.

Figure 14:
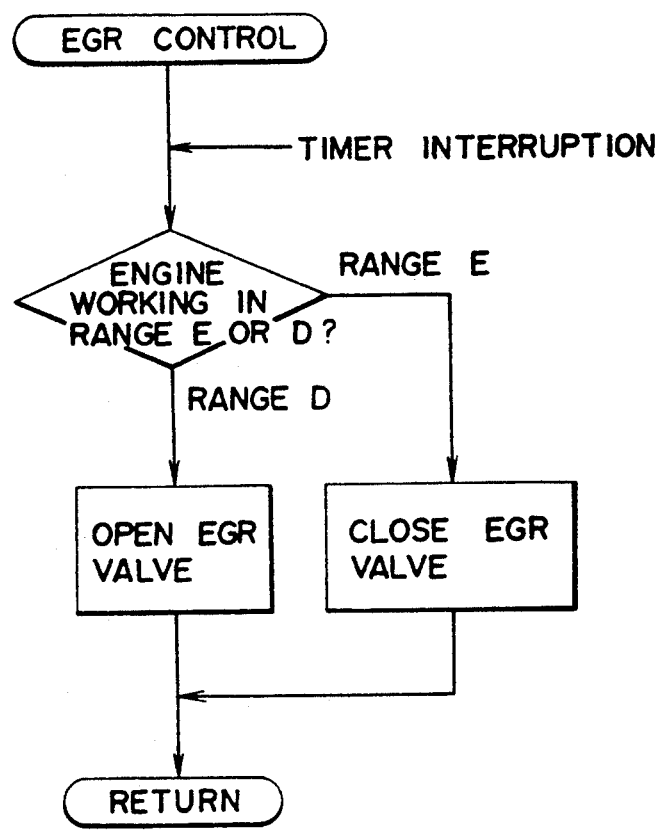
FIG. 14 is a flowchart of a program for EGR control.

The EGR control mechanism operates according to the sequence shown in FIG. 14. When the engine is started by the timer at the specified intervals, the controller 9 checks the engine speed Ne and the load L read therein, and identifies the present working condition of the engine referring to the EGR control map (FIG. 7). When the engine is working at loads $L \leq L_1$ and speeds $Ne \leq Ne_3$ which correspond to the EGR range D, the controller 9 operates the duty solenoid valve 15 and passage selecting valve 14 (shown in FIG. 1) so as to transmit the negative pressure to the EGR valve 13 from the vacuum pump 16, open the EGR passage 12, and conduct part of the exhaust gas to the inlet passage 12. The EGR range D is established when the engine is working at low loads and low and middle speeds, so that the exhaust gas is recirculated to decrease the amount of fresh air to be introduced and to reduce NOx by lowering the combustion temperature. In this case, $L_1 = (0.45$ to $0.55)$ L max, and $Ne_3 = (0.8$ to $0.85)$ Ne max.

Figure 9:
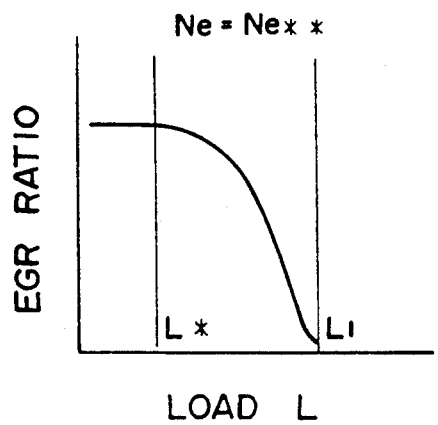
FIG. 9 is a graph showing the relationship between an EGR ratio and the load.

FIG. 9 shows the relationship between the EGR ratio and the load L when the engine speed Ne is $Ne^{**}$ (shown in FIG. 7). The controller 9 controls the duty solenoid valve 15 so that a high EGR ratio is maintained for low loads $L^*$ and is gradually lowered as the load L reaches the threshold value $L_1$. Thus, the controller 9 regulates the amount of the exhaust gas to be recirculated. As the load L becomes higher, more air is necessary for fuel combustion. In this case, no exhaust gas is recirculated, for thereby suppressing soot.

Figure 10:
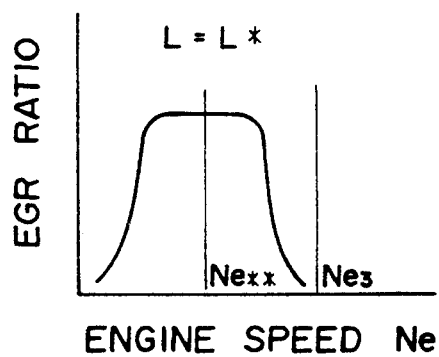
FIG. 10 is a graph showing the relationship between the EGR ratio and the engine speed.

FIG. 10 shows the relationship between the EGR ratio and the engine speed Ne when the load L is $L^*$ (shown in FIG. 7). The amount of the exhaust gas to be recirculated is decreased to conduct as much fresh air as possible when the engine speed Ne is extremely low and when $Ne_3$ is approximately (0.8 to 0.85) Ne max.

When the engine is working at speeds and loads corresponding to the non-EGR region D (shown in FIG. 7), the controller 9 closes the EGR valve 13 so as not to recirculate the exhaust gas. This is because much soot would be formed if exhaust gas were recirculated under this condition.

Figure 15:
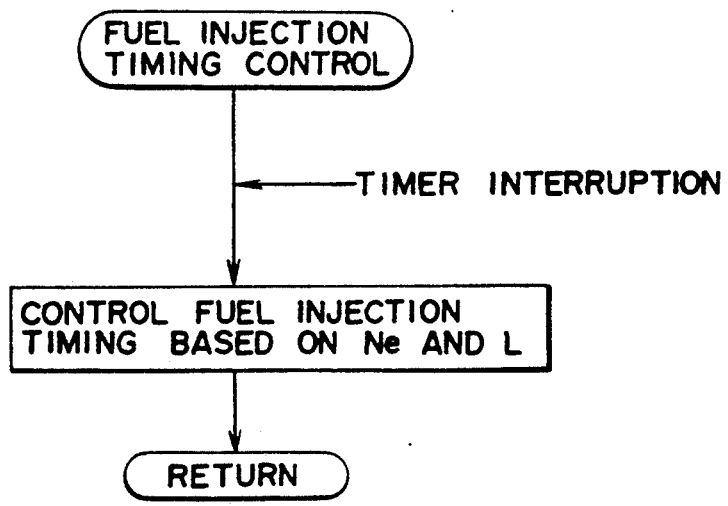
FIG. 15 is a flowchart of a program for injection advance timing.

The injection advance timing will be described with reference to FIG. 15. When the engine is started by the timer at the specified intervals, the controller 9 checks the engine speed Ne and the load L stored therein, and determines the injection advance timing according to the injection advance control the map. As shown in map of FIG. 8, as the engine speed.Ne becomes higher, the injection timing is advanced to lengthen the combustion stroke and operate the engine efficiently at any load. The injection timing $\theta$ inj is retarded from the timing $\theta$ inj* when the engine is working at the speed Ne=Ne* and at middle and high loads as shown in FIG. 11. When the load L is extremely low, the injecting timing $\theta$ inj is extensively advanced to expedite the fuel injection.

When the engine is working at higher loads, more NOx will be emitted. In such a case, the fuel injection timing is retarded to decrease formation of NOx. When the engine loads are not so high, the combustion temperature is relatively low, so that NOx will not be formed in a large amount. As the loads become lower, less fuel will be injected. In this case, the fuel is jetted in the form of large particles, which will cause incomplete burning of the fuel, and the increase of particulates containing hydrocarbon. To cope with this phenomenon, the fuel injection timing is extensively advanced at very low loads to lengthen the period during which the air and fuel are mixed to enhance complete burning of the fuel. Therefore, as small amount of fuel will remain unburned, and hydrocarbon and SOF in the particulates will be decreased.

Needless to say, the foregoing variable swirl control, EGR control and fuel injection timing control are simultaneously carried out depending on the engine working conditions.

According to the invention, the diesel engine can decrease NOx in the exhaust gas, and particulates containing hydrocarbon to a satisfactory degree by a combination of the variable swirl control mechanism, the EGR control mechanism and the injection timing control mechanism. These control mechanisms function in cooperation with each other so as to prevent the decrease of the engine efficiency and to keep excellent engine performance.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for controlling a diesel engine, comprising the steps of:
    (a) generating strong air swirls in a combustion chamber when the engine is working at low speeds and high loads, middle air swirls in said combustion chamber when the engine is working at low loads and at middle speeds and high loads, and weak air swirls in said combustion chamber when the engine is working at high speeds and high loads by a variable swirl forming mechanism;
    (b) recirculating a part of exhaust gas to said combustion chamber when the engine is working at low and middle speeds and low loads by an exhaust gas recirculation (EGR) control mechanism;
    (c) advancing the fuel injection timing when the engine is working at low loads by an injection timing control mechanism;
    (d) retarding the fuel injection timing when the engine is working at middle and high loads by said injection timing control mechanism; and
    (e) controlling said steps (a)–(d) according to loads and speeds of the engine by a controller.

2. A method for controlling a diesel engine according to claim 1, wherein said controller closes an auxiliary swirl valve of said variable swirl forming mechanism at said step (e) so as to conduct air only via a main port of said variable swirl forming mechanism and to form strong air swirls in said combustion chamber when engine loads are equal to or more than 0.6 to 0.7 times the maximum load and engine speeds are equal to or less than 0.45 to 0.55 times the maximum speed.

3. A method for controlling a diesel engine according to claim 1, wherein said controller opens an auxiliary swirl valve of said variable swirl forming mechanism at said step (e) so as to conduct air via a main port and a sub-port of said variable swirl forming mechanism and to form weak air swirls in said combustion chamber when the engine loads are equal to or more than 0.6 to 0.7 times the maximum load and engine speeds are equal to or more than 0.65 to 0.75 times the maximum speed.

4. A method for controlling a diesel engine according to claim 1, wherein said controller half closes an auxiliary swirl valve of said variable swirl forming mechanism at said step (e) so as to conduct air via a main port and a sub-port of said variable swirl forming mechanism and to form middle air swirls in said combustion chamber when engine loads are equal to or less than 0.6 to 0.7 times the maximum load and at any engine speed, and when engine speeds are more than 0.45 to 0.55 times the maximum speed and equal to or less than 0.65 to 0.75 times the maximum speed and when engine loads are equal to or more than 0.6 to 0.7 times the maximum load.

5. A method for controlling a diesel engine according to claim 1, wherein said controller opens a valve of said EGR control mechanism at said step (e) to establish an EGR region where exhaust gas is recirculated to said combustion chamber when engine loads are equal to or less than 0.45 to 0.55 times the maximum load and engine speeds are equal to or less than 0.8 to 0.85 times the maximum speed.

6. A method for controlling a diesel engine according to claim 5, wherein said controller controls said valve of said EGR control mechanism at said step (e) so as to decrease the amount of the exhaust gas to be recirculated when the engine is working at approximately 0.45 to 0.55 times the maximum load in said EGR region.

7. A method for controlling a diesel engine according to claim 6, wherein said controller controls said valve of said EGR control mechanism at said step (e) to decrease the amount of exhaust gas to be recirculated when engine speeds are low in said EGR region or when engine speeds are approximately 0.8 to 0.85 times the maximum speed, and to increase the amount of exhaust gas to be recirculated when engine speed are between the foregoing ranges.

8. A method for controlling a diesel engine according to claim 4, wherein said controller opens said valve of said EGR control mechanism at said step (e) so as to establish an EGR region where exhaust gas is recirculated to said combustion chamber when engine loads are equal to or less than 0.45 to 0.55 times the maximum load and engine speeds are equal to or less than 0.8 to 0.85 times the maximum speed.

9. A method for controlling a diesel engine according to claim 8, wherein said controller controls said valve of said EGR control mechanism at said step (e) so as to decrease the amount of the exhaust gas to be recirculated when the engine is working at approximately 0.45 to 0.55 times the maximum load is said EGR region.

10. A method for controlling a diesel engine according to claim 9, wherein said controller controls said valve of said EGR control mechanism at said step (3) so as to decrease the amount of exhaust gas to be recirculated when engine speeds are low in said EGR region or when engine speeds are approximately 0.8 to 0.85 times the maximum speed, and to increase the amount of exhaust gas to be recirculated when engine speeds are between the foregoing ranges.

11. A method for controlling a diesel engine according to claim 1, wherein said controller controls said injection timing controller at said step (e) to retard the injection timing at low engine speeds, linearly advance the injection timing according to an increase of engine speeds, and maintain a predetermined injection timing at high engine speeds.

12. A method for controlling a diesel engine according to claim 11, wherein said controller advances the injection timing at low engine loads, retards the injection ing most at middle engine loads, and advances the injection timing gradually at high engine loads at said step (e).

13. A method for controlling a diesel engine according to claim 10, wherein said controller retards the injection timing at low engine speeds, linearly advances the injection timing according to an increase of engine speeds, and maintains a predetermined injection timing at high engine speeds at said step (e).

14. A method for controlling diesel engine according to claim 13, wherein said controller advances the injection timing at low engine loads, retards the injection timing most at middle engine loads, and advances the injection timing gradually at high engine loads at said step (e).

* * * * *